Oct. 8, 1940.    D. S. LITTLE    2,216,952
INDICATOR
Filed March 31, 1938

Inventor
David S. Little
By J. Huff
Attorney

Patented Oct. 8, 1940

2,216,952

UNITED STATES PATENT OFFICE 2,216,952

INDICATOR

David S. Little, Riverton, N. J., assignor to Radio Corporation of America, a corporation of Delaware Application March 31, 1938, Serial No. 199,229

5 Claims. (Cl. 116—129)

This invention relates to indicators, and has special reference to the provision of improvements in pointers for indicating the relative position of a moving element (such, for example, as the tuning shaft of a radio receiver) with respect to a stationary member (such, for example, as a linear or arcuate scale).

The principal object of the present invention is to provide an indicator and pointer therefor which will give a true reading irrespective of the position of the pointer with respect to the observer.

Figure 1:
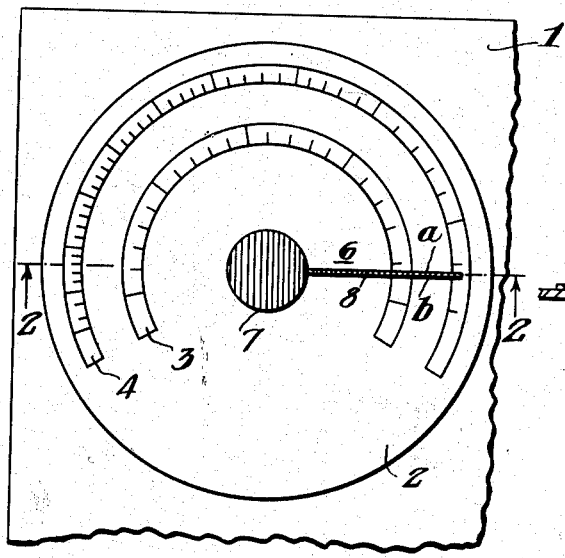
Figure 2:
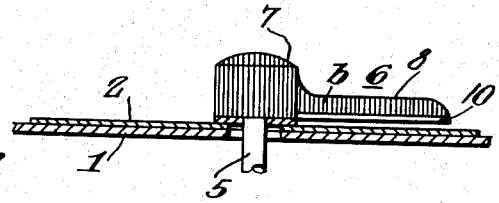

Certain details of construction, together with other objects and advantages, will be apparent and the invention itself will be best understood by reference to the following specification and to the accompanying drawing, wherein:

Figure 1 is a front elevational view of a plural-scale indicator including a pointer constructed in accordance with the principle of the invention, Figure 2 is a sectional view taken on the line 2—2 of Fig. 1, and Figures 3, 4, and 5 are diagrammatic views illustrative of the appearance of the pointer of Figs. 1 and 2 as viewed from different angles.

In the drawing, wherein like reference characters designate the same or corresponding parts in all figures, 1 designates a portion of the front panel of a radio receiver to which a dial plate 2, having two concentric frequency band-scales 3 and 4, is affixed. Journaled in the dial plate 2 is a rotatable tuning shaft 5, the terminal of which may protrude centrally beyond the scale bearing surface of plate 2. The angular position of shaft 5, and hence the frequency to which the tuning apparatus is adjusted, is indicated by a pointer 6 when it is observed in conjunction with one or the other of the band scales 3 or 4. A hub 7, fixed to the shaft 5 by any suitable or convenient means, constitutes a mount for the pointer 6.

In accordance with the invention, the pointer 6 comprises a blade or strip (i. e., a narrow, relatively long piece) mounted for movement with its principal or major surfaces a, b, in planes normal and adjacent to the scale bearing surface 2. The exposed or outer edge of the pointer and the edges of its major surfaces, which lie adjacent scale bearing surface 2, are provided with reference lines 8, 9 and 10, respectively, which are preferably of a color which contrasts with the color of the rest of the major area of the pointer. Thus the reference lines 8, 9 and 10 may be constituted of radium paint when the pointer per se comprises a solid black background.

The reference line 8 should preferably be confined to the exposed edge of the blade so that it is invisible when viewed at other than a small angle with respect to the scale bearing surface 2.

Figure 3:
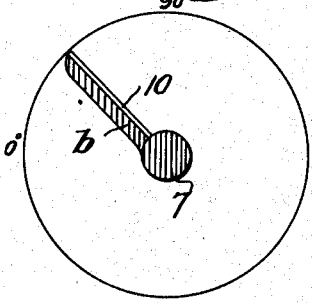
Figure 4:
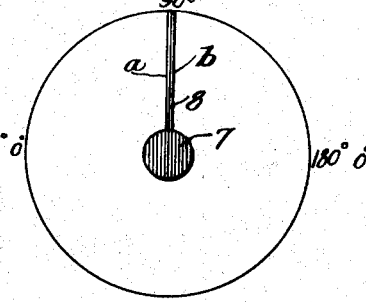
Figure 5:
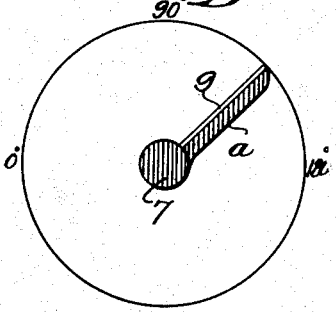

The particular reference line selected for reading the scales 3 and 4 will depend upon the position of the pointer with respect to the observer. Thus, as indicated in Fig. 3, when the pointer is in a position between 0 and 90, the line 10 on the bottom or inner right hand side (b) of the blade is selected as the pointer reference line. When, as shown in Fig. 4, the pointer is operated near that scale marking or point which is designated 90, the white or colored thin edge 8 on the top of the blade is the observed reference line. On the other hand, when the pointer is in the position intermediate the points 90 and 180, as shown in Fig. 5, the distinctive line 9 on the bottom or inner left hand side (a) of the blade is employed as the reference line.

Since the pointer marking selected as a reference line is that line which is the closest visible line to the scale bearing surface, parallax is reduced to an absolute minimum regardless of the observer's position with respect to the dial.

While the invention has been described as applied to an indicator for a radio receiver, it will be apparent that the invention is not limited to such application and that the disclosure in this respect is merely illustrative for purposes of explaining the inventive concept.

What is claimed is:

1. The combination with a scale bearing surface, of a pointer comprising a flat strip mounted for movement with its major surfaces in planes normal to said scale bearing surface and a plurality of reference lines extending along the exposed edges of said strip and directed to a common point on said scale bearing surface.

2. The combination with a scale bearing surface, of a pointer comprising a flat strip mounted for movement with its major surfaces in planes normal to said scale bearing surface, the exposed long edges of the major surfaces of said strip which lie adjacent to the scale bearing surface being marked with reference lines which extend therealong and are directed to a common point on said scale bearing surface.

3. The invention as set forth in claim 2 and wherein said flat pointer is provided with a third reference line which is confined to and extends along that narrow surface of said strip which lies remote from said scale bearing surface.

4. The combination with a scale bearing surface, of a pointer comprising a flat strip mounted for movement with its major surfaces in planes normal to said scale bearing surface, that edge of each of the major surfaces of the strip which lies adjacent said scale bearing surface and the thin edge of said strip which lies remote from said scale bearing surface each being provided with a reference line, said reference lines being all directed to a common point on said scale bearing surface.

5. The invention as set forth in claim 4, wherein the major surfaces of said pointer are of a dark hue and said reference lines are constituted of a fluorescent substance.

DAVID S. LITTLE.